United States Patent [19]

Grimes et al.

[11] Patent Number: 4,558,772

[45] Date of Patent: Dec. 17, 1985

[54] ELECTRONIC CONTROL FOR A STARTING CLUTCH

[75] Inventors: Michael R. Grimes; William J. Vukovich, both of Ypsilanti, Mich.

[73] Assignee: General Motors Corporation, Detroit, Mich.

[21] Appl. No.: 645,338

[22] Filed: Aug. 29, 1984

[51] Int. Cl.$^4$ .............................................. B60K 41/02
[52] U.S. Cl. ............................. 192/0.076; 192/103 R; 361/242
[58] Field of Search ............... 192/0.075, 0.076, 0.084, 192/0.096, 103 R; 361/242

[56] References Cited

U.S. PATENT DOCUMENTS

| | | | |
|---|---|---|---|
| 4,023,660 | 5/1977 | Dickinson | 192/0.075 |
| 4,081,065 | 3/1978 | Smyth et al. | 192/0.076 |
| 4,403,682 | 9/1983 | Norris et al. | 192/0.076 X |
| 4,413,714 | 11/1983 | Windsor | 192/0.033 |
| 4,418,810 | 12/1983 | Windsor | 192/0.076 |
| 4,432,445 | 2/1984 | Windsor | 192/0.076 |
| 4,488,625 | 12/1984 | Nobumoto et al. | 192/103 R X |
| 4,497,397 | 2/1985 | Windsor et al. | 192/0.076 |
| 4,514,811 | 4/1985 | Daubenmier et al. | 192/0.076 X |

FOREIGN PATENT DOCUMENTS 57-137724  8/1982  Japan ............................. 192/0.076

Primary Examiner—Lawrence J. Staab
Attorney, Agent, or Firm—Mark A. Navarre

[57] ABSTRACT

An electronic control for energizing an electrically operated valve of a motor vehicle starting clutch at a level which compensates for performance variations of the valve and/or clutch so that the desired clutch engagement feel may be repeatably produced. The compensated energization level is formed by the combination of a principal term determined as a function of engine speed and a corrective, or vernier, term determined as a function of engine speed deviation from a reference engine speed. The reference engine speed is obtained by determining the desired steady state engine speed for the clutch engagement and applying thereto a time response characteristic that generally resembles that of the vehicle engine.

3 Claims, 15 Drawing Figures

ELECTRONIC CONTROL FOR A STARTING CLUTCH

This invention relates to motor vehicle clutch controls and more particularly to an electronic control for a motor vehicle starting clutch.

BACKGROUND OF THE INVENTION

In certain motor vehicle applications, a friction starting clutch is connected in the vehicle driveline between the engine and the drive wheels such that disengagement of the clutch effectively unloads the engine when the vehicle is at rest. To accelerate the vehicle from rest, the clutch is engaged at a controlled rate to progressively increase its torque capacity. As a result, the clutch transmits a controlled amount of the engine output torque to the drive wheels, and the vehicle is smoothly accelerated.

Generally, the starting clutch is engaged by fluid pressure, necessitating the use of an electrical-to-hydraulic actuator if engagement of the clutch is electronically controlled. When the actuator takes the form of a solenoid-operated fluid valve, the engagement pressure, and hence the torque capacity of the clutch, is controlled by energizing the solenoid at a variable duty cycle. Controllers for clutches of this type generally operate in open loop fashion. That is, the controller arrives at an energization command for the actuator and the resulting engagement pressure is not directly measured. Rather, the controller relies on a known relationship between the energization duty cycle and the resulting torque capacity of the clutch. Unfortunately, however, this relationship tends to vary—not only from actuator to actuator but with other constraints such as temperature and voltage. In addition, the performance of the clutch may vary with age and wear. As a result, the engine speed response during engagement of the clutch is not repeatable and the vehicle performance or efficiency may become impaired.

SUMMARY OF THE INVENTION

The controller of this invention overcomes the above problem by adaptively compensating the actuator energization duty cycle for variations in engine speed during clutch engagement due to variations in the actuator and clutch. According to this invention, the duty cycle of energization applied to the actuator is determined by the combination of a principal duty cycle value and a vernier, or corrective, duty cycle value. The principle duty cycle value is determined as a function of engine speed and operates during engagement of the clutch to bring the engine speed into correspondence with a steady state engine speed value that is engine torque dependent. The vernier, or corrective, duty cycle value is determined according to the integral of the difference between the actual engine speed and a reference engine speed. The reference engine speed value is based on the desired value of steady state engine speed to be maintained during engagement of the clutch, but is developed in accordance with a dynamic time response characteristic that closely matches the time response characteristic of the engine. Thus, a step change in the desired value of steady state engine speed (due to a step change in the engine throttle or torque) produces a dynamic, or time varying, change in the reference engine speed value that closely approximates the ability of the engine to undergo the desired speed change. The dynamic nature of the engine speed reference stabilizes the actual engine speed response during engagement of the clutch, and the integration of the difference between the actual engine speed and the reference engine speed ensures that the engine speed will attain the desired steady state value despite variation in the actuator valve and clutch.

IN THE DRAWINGS

Figure 1:
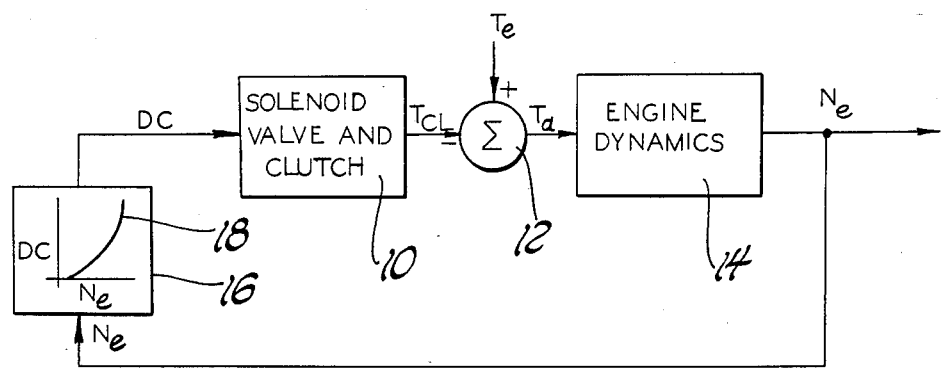
FIG. 1 is a diagram of a control system for generating a principal duty cycle value.

Referring now to the drawings and more particularly to the control system diagram of FIG. 1, the block designated by the reference numeral 10 represents a fluid-operated friction clutch and a solenoid-operated hydraulic value that directs fluid to the clutch for controlling its ability to transmit engine torque. Thus, the input to block 10 is energization duty cycle DC, and the output of block 10 is clutch torque capacity $T_{CL}$. Schematic depictions of the clutch and valve are shown and described below in reference to FIG. 7. As indicated at the summing junction 12, the torque $T_a$ available for accelerating the engine is equal to the torque $T_e$ produced by the engine less the torque $T_{CL}$ transmitted by the clutch to the vehicle drivetrain. The block 14 represents the engine inertia and other parameters which contribute to its dynamic response. Thus, the input to block 14 is accelerating torque $T_a$, and the output of block 14 is engine speed $N_e$. The block 16 represents a clutch controller responsive to the engine speed $N_e$ for generating an energization duty cycle value DC in accordance with a predetermined schedule graphically depicted therein by the trace 18. Such duty cycle value is referred to hereinafter as the principal duty cycle value.

Figure 2:
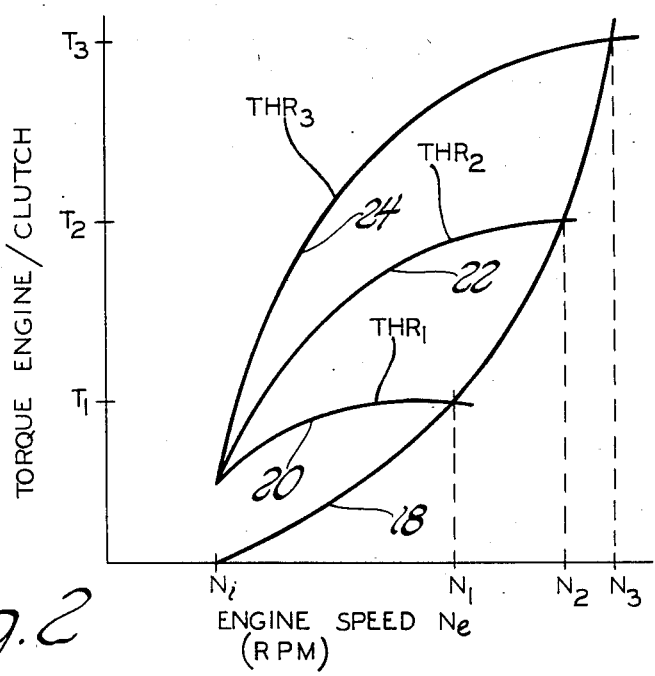
FIG. 2 is a graph depicting the engine torque and clutch torque capacity as a function of engine speed for the control system depicted in FIG. 1.
Figure 3:
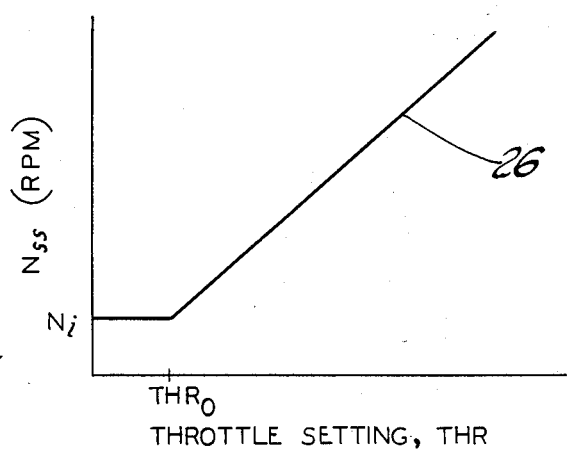
FIG. 3 is an idealized graph of the steady state engine speed during clutch engagement as a function of engine throttle position for the control system depicted in FIG. 1.

The energization duty cycle schedule depicted in block 16 of FIG. 1 is reproduced in FIG. 2, along with engine torque traces 20, 22 and 24 for the throttle settings $THR_1$, $THR_2$, $THR_3$. Together, the traces describe the operation of the control system shown in FIG. 1. For the throttle setting $THR_1$, for example, the engine torque vs. engine speed relationship is given by the trace 20, and the steady state engine speed $N_{ss}$ attained during clutch engagement is determined by the intersection of the traces 18 and 20—the engine speed $N_1$ for which the engine torque $T_e$ and clutch capacity $T_{CL}$ are equal at the value $T_1$. Similarly, the throttle settings $THR_2$ and $THR_3$ result in the steady state engine speed and torque values $N_2$, $T_2$ and $N_3$, $T_3$, respectively. Such variation in the steady state engine speed $N_{ss}$ with engine throttle setting THR is graphically depicted by the trace 26 in FIG. 3, where $THR_0$ represents the lowest throttle setting which will initiate clutch engagement. Thus, when the vehicle is at rest, any throttle setting in excess of $THR_0$ will initiate clutch engagement and the engine speed will increase from its idle value $N_i$ to its throttle dependent steady state value $N_{ss}$. This operation is graphically depicted by the trace 28 in FIG. 5, for a step change in throttle setting at time $T_o$. In such depiction, the idle speed $N_i$ is approximately 450 rpm and the steady state engine speed $N_{ss}$ is approximately 2000 rpm.

Figure 4:
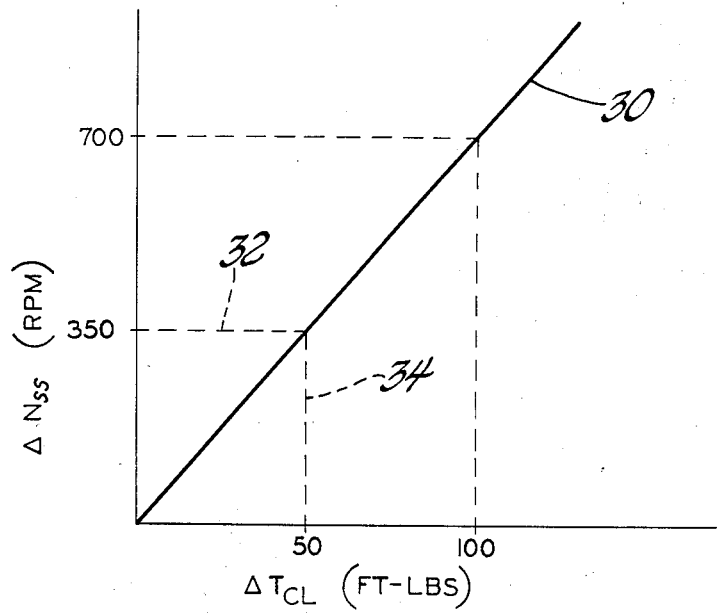
FIG. 4 is an empirically derived graph of °variation in the steady state engine speed during clutch engagement as a function of clutch engagement pressure variation for the control system depicted in FIG. 1.

A drawback of the relatively simple control system of FIG. 1 stems from the fact that the clutch control is premised on the nominal performance characteristics of the clutch and solenoid-operated valve. Unfortunately, such characteristics change with a number of factors, including temperature, system voltage, and wear. Moreover, there are part-to-part tolerance variations which cannot be accounted for. The effect of such performance variations is graphically depicted in FIGS. 4 and 5. In FIG. 4, the variation in steady state engine speed $N_{ss}$ as a function of variation in clutch torque capacity $T_{CL}$ is given by the trace 30. As indicted by the dashed lines 32 and 34, it is thus seen that a 50 ft-lb change in clutch torque capacity (due to actuator miscalibration, for example) changes the steady state engine speed $N_{ss}$ during clutch engagement by 350 RPM. Such a variation is seen in the traces 36 and 38 of FIG. 5, which depict the engine speed $N_e$ as a function of time during clutch engagement. As indicated above, the trace 28 represents the engine speed trajectory obtained with nominal system performance characteristics, where 2000 RPM is the steady engine speed value. The traces 36 and 38 represent engine speed trajectories obtained when clutch and/or valve performance variations respectively decrease and increased the clutch torque capacity $T_{CL}$ during the clutch engagement by 50 ft-lbs.

Figure 5:
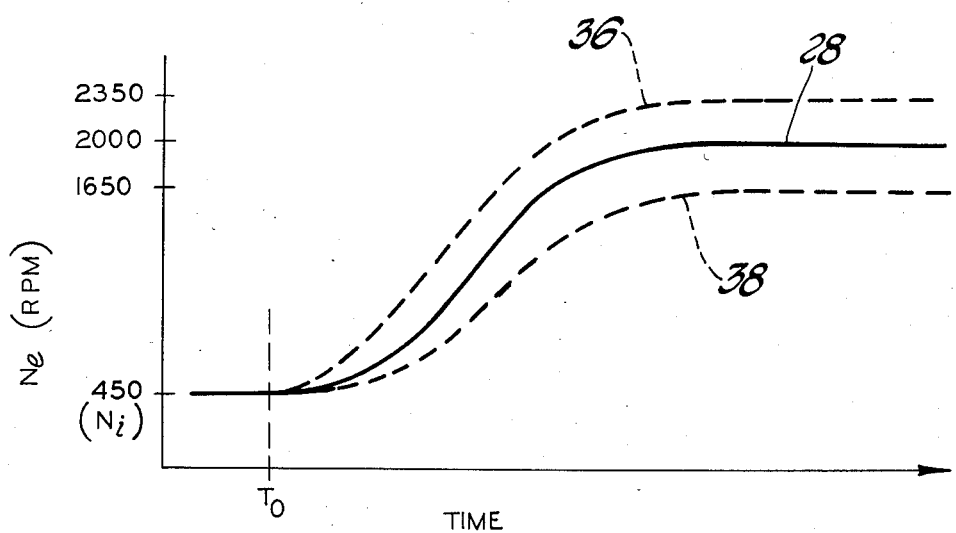
FIG. 5 is a graph of engine speed during clutch engagement as a function of time for the control system depicted in FIG. 1, illustrating the result of clutch engagement pressure variation.

The engine speed variations illustrated in FIG. 5 are unacceptable for a starting clutch control system. Not only is it impossible to repeatably control clutch engagement, but the system performance and efficiency may be imparied. On the other hand, it is impractical to compensate the control for the individual sources of performance variation in the system. Commonly used expedients that correct one portion of the response adversely affect other portions of the response. For example, an integrator feedback loop may be added to ensure that there is no steady state engine speed error, but not without introducing an instability in the transient portion of the response. This invention provides a novel approach for compensating the control for variations in both the transient and steady state engine speed response due to variations in the performance characteristics of the actuator and clutch. As a result, the engine speed response is repeatably controlled, and the desired system performance and efficiency are consistently achieved.

Figure 6:
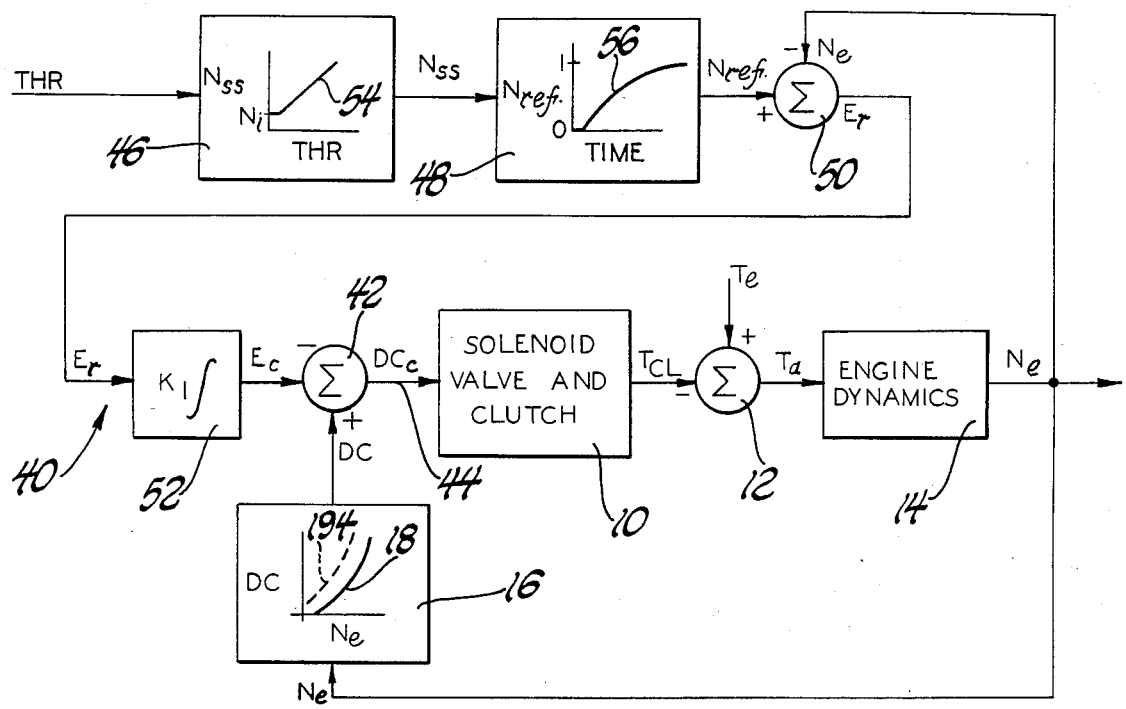
FIG. 6 is a diagram of a control system for generating principal and vernier, or corrective, duty cycle values in accordance with this invention.

A diagram of the control system according to this invention is depicted in FIG. 6. Where appropriate, the reference numerals used to designate the control blocks in FIG. 1 have been repeated. Thus, the reference numeral 10 designates the solenoid-operated valve and clutch, the reference numeral 12 designates a summing junction for clutch torque capacity $T_{CL}$ and engine output torque $T_e$, the reference numeral 14 designates the engine dynamic characteristics, and the reference numeral 16 designates the primary, or principal, clutch control mechanism. In the control system of FIG. 6, however, a corrective term $E_c$ for the duty cycle value DC is developed by a vernier, or corrective, clutch control mechanism designated generally by the reference numeral 40. Such corrective term $E_c$ is combined with the output DC of the principal clutch control mechanism 16 by summing junction 42 to form a compensated or corrected duty cycle command $DC_c$ for the solenoid valve 10 on line 44. Generally, the control mechanism 40 comprises dynamic reference generating means represented by the blocks 46 and 48 for developing an engine speed reference $N_{ref}$, a summing junction 50 for combining the engine speed reference $N_{ref}$ with the actual engine speed $N_e$ to form an error term $E_r$, and an integrator 52 for integrating the error term $E_r$ with respect to time to form the corrective term $E_c$.

The block 46 is responsive to the engine throttle setting THR and develops an output $N_{ss}$ corresponding to the proper throttle dependent steady state engine speed to be maintained during clutch engagement. As indicated above, such speeds are initially determined by the operation of the principal clutch control mechanism 16. The speed values $N_{ss}$ represented by the trace 54 in block 46 are matched with the values of $N_{ss}$ which occur with the control system of FIG. 1 when the performance characteristics of the solenoid valve and clutch 10 and are at their nominal levels. Thus, the trace 54 corresponds directly to the trace 26 depicted in FIG. 3. The block 48 is responsive to the desired steady state engine speed term $N_{ss}$ and is effective to impose thereon a time response characteristic that generally resembles that of the vehicle engine. Such characteristic may be represented by a first or higher order transfer function and is graphically depicted in block 48 by the trace 58. Thus, the engine speed reference $N_{ref}$ is a time-varying reference which begins at a value corresponding to the engine idle speed $N_i$ and increases therefrom at a predetermined rate to a value corresponding to the desired steady state engine speed $N_{ss}$. The predetermined rate of increase generally corresponds to the speed response characteristic of the engine—the transfer function which describes the ability of the engine to change speed in response to a change in the throttle setting. This ensures stability of response while the engine speed is increasing from idle to its steady state value $N_{ss}$. The integrator 52 minimizes the steady state deviation of the actual engine speed $N_e$ from the reference engine speed $N_{ref}$ so that once the engine speed has increased to the steady state value $N_{ss}$, it is maintained at that value during the remainder of the clutch engagement, regardless of any performance variations in the solenoid valve and clutch.

Figure 7:
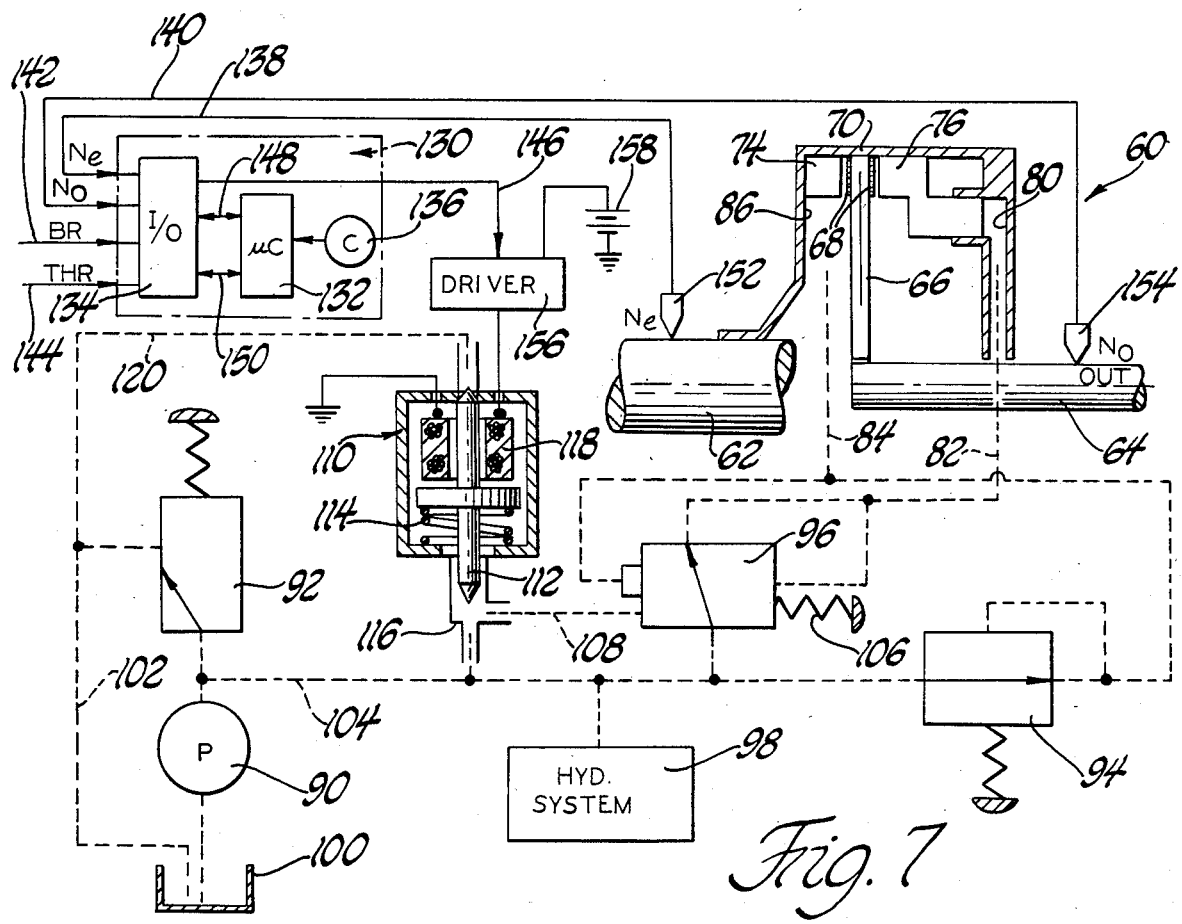
FIG. 7 is an electric/hydraulic diagram of the clutch control system of this invention when mechanized with a microcomputer-based controller.

A mechanization of the clutch, actuator, and control system of this invention is graphically depicted in FIG. 7. The reference numeral 60 generally designates a starting clutch coupling an annular input shaft 62 (which may be an extension of the engine output shaft) to an output shaft 64. A clutch plate and damper assembly 66 having friction material 68 at the periphery thereof is splined to the output shaft 64 and is adapted to rotate therewith inside the housing member 70. The housing member 70 is connected to rotate with the input shaft 62, and supports a clutch assembly comprising an axially fixed backing plate 74 and an axially movable piston 76 on opposite sides of the clutch plate and damper assembly 66. The piston 76 disposed at one end within a fluid conducting passage 80 in housing member 70, and fluid under pressure may be supplied thereto via line 82 to generate an apply force which urges the piston 76 and backing plate 74 into engagement with the friction material 68 of clutch plate and damper assembly 66. An opposing, or release, force tending to disengage the friction elements is generated by supplying fluid under pressure via line 84 to an interior chamber 86 of housing member 70. The torque capacity of the clutch 60 is proportional to the resultant of the apply and release forces, and since the areas on which the fluid pressures operate are substantially equal, the torque capacity is proportional to the fluid pressure differential between the lines 82 and 84. As will be described below, the fluid pressure in line 84 is maintained substantially constant and the fluid pressure in line 82 is varied to control the torque capacity.

A number of hydraulic elements including a pump 90, pressure regulator valves 92 and 94, and a clutch apply valve 96 are diagrammatically depicted in FIG. 7. If the elements are part of an automatic transmission control system, the remaining hydraulic elements are represented by the block 98. The pump 94 may be of conventional positive or variable displacement design, and is operative to supply fluid from reservoir 100 at a relatively high pressure to the input of pressure regulator 92. As indicated in the drawing, the fluid from pump 90 opposes a spring generated force to return a variable amount of fluid to reservoir 100 via the line 102, thereby regulating the fluid pressure in line 104 at a controlled value. The pressure in line 104 is generally referred to as the line pressure and is connected as an input to the pressure regulator valve 94 and to the clutch apply valve 96. The pressure regulator valve 94 is of the downstream type as shown and is effective to regulate the fluid pressure in line 84 at a substantially constant value, thereby generating a substantially constant fluid pressure in the chamber 86 of clutch 60. The clutch apply valve 96 is effective to supply fluid from line 104 at a variable pressure to line 82 and the passage 80 of clutch 60. The value of the pressure supplied to line 82 is determined by the resultant, or net, force acting on a valve element thereof. The valve element is urged in the leftward direction as shown in FIG. 7 by the spring 106 and the fluid pressure in line 82, and in the rightward direction by the fluid pressures in lines 84 and 108. The fluid pressure in line 108 is generated from line pressure by the solenoid-operated actuator 110, and the spring 106 maintains the pressure in line 82 slightly higher than that in line 84 when the actuator 110 is supplying full line pressure to line 108. As a result, the piston 76 and backing plate 74 are maintained in very slight engagement with the clutch plate and damper assembly 66 when the fluid pressure in line 108 is at line pressure. As the fluid pressure in line 108 is decreased from line pressure, the fluid pressure supplied to line 82 by clutch apply valve 96 is increased, increasing the torque capacity of clutch 60.

The solenoid-operated actuator 110 comprises an axially movable pintle 112, a spring 114 for urging the pintle 112 away from the seat 116 to the position shown in the drawing, and a solenoid coil 118 effective when energized to overcome the spring force and move the pintle 112 into engagement with the seat 116. When the coil 118 is deenergized, fluid pressure from line 104 is supplied past the seat 116 to the line 108, and fluid leaking around the pintle 112 is returned to the reservoir 100 via the line 120. When the coil 118 is energized, the passage between lines 104 and 108 is blocked by pintle 112, and the fluid in line 108 leaks around pintle 112 and is returned to reservoir 100 via the line 120. To produce a variable fluid pressure in the line 108, and thus a variable level of clutch torque capacity, the coil 118 is pulse-width-modulated at a variable duty cycle.

The energization duty cycle applied to solenoid coil 118 is regulated by a control unit 130, which comprises a microcomputer (uC) 132, an input/output unit (I/O) 134, and high frequency clock (C) 136. The input/output unit 134 is adapted to receive input signals for microcomputer 132 on lines 138, 140, 142, and 144, and to apply a corrected duty cycle output signal ($DC_c$) from microcomputer 132 to line 146. The input/output unit 134 communicates with the microcomputer 132 via an address and control bus 148 and a data bus 150. The microcomputer 132 executes a series of program instructions stored therein to develop the duty cycle output signal, and clock 136 controls the timing of such execution. The elements of control unit 130 are all conventional, off-the-shelf components and do not require further description.

The input signals for control unit 130 include an engine speed signal ($N_e$) on line 138, an output speed signal ($N_o$) on line 140, a brake signal (BR) on line 142, and a throttle setting signal (THR) on line 144. The engine speed and output speed signals on lines 138 and 140 are obtained with the speed transducers 152 and 154, respectively. The transducers 152 and 154 are of conventional construction, and may be of the variable reluctance type. The brake and throttle setting input signals may also be otained from transducers of conventional construction; the brake signal indicates if the vehicle brake is depressed, and the throttle setting signal indicates the relative position of the engine throttle or accelerator pedal. The driver circuit 156 is also of conventional design and operates to energize the solenoid coil 118 with current from battery 158 in accordance with the duty cycle output signal from control unit 130 on line 146.

Figure 8:
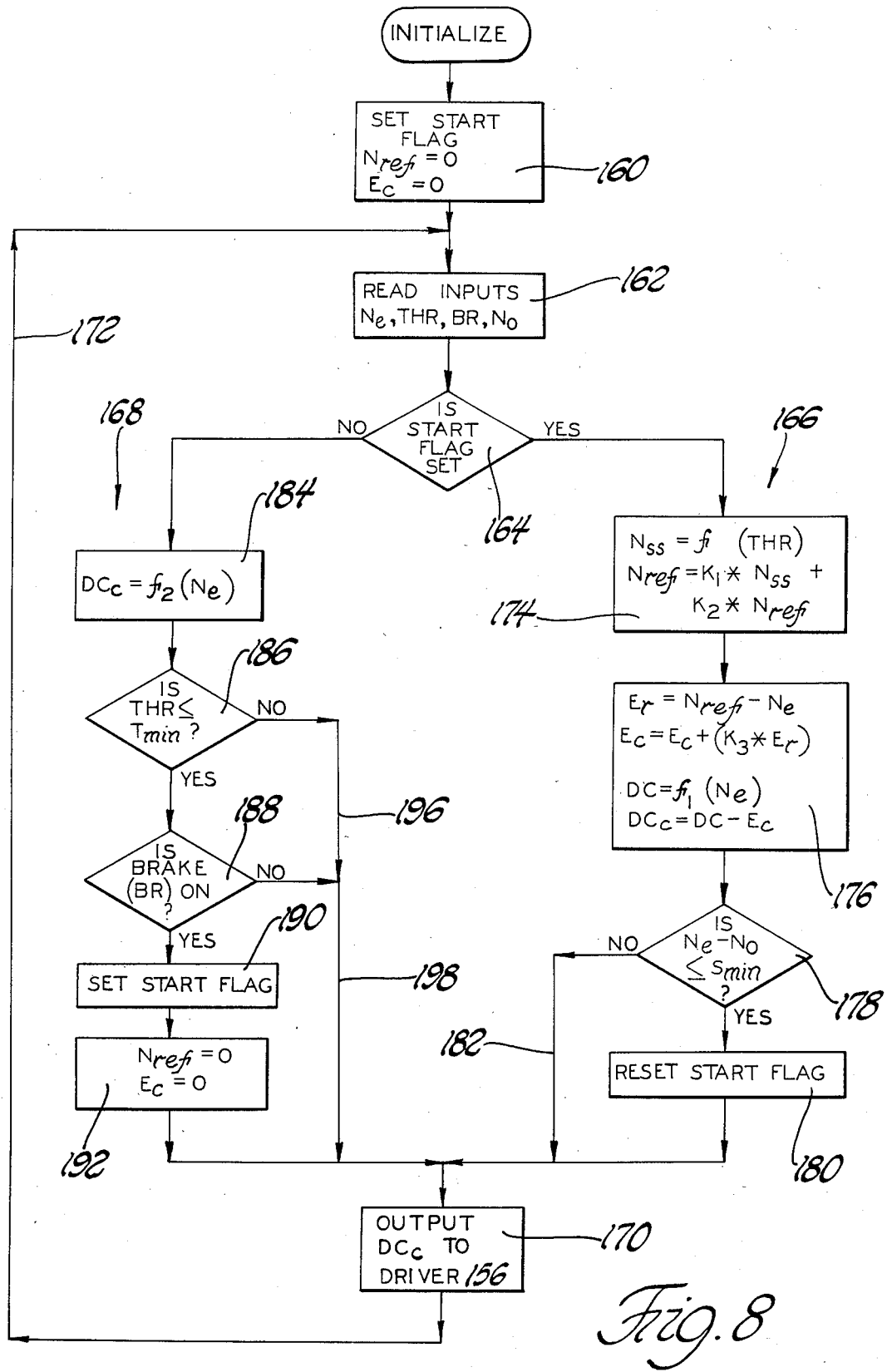
FIG. 8 is a flow chart representing the program instructions executed by the microcomputer based controller depicted in FIG. 7.

FIG. 8 depicts a flow chart representative of the program instructions executed by microcomputer 132 in carrying out this invention. At the initiation of each period of vehicle operation the instruction block 160 is executed to initialize the various input values and internally defined variables and flags to predetermined values. Then, instruction block 162 is executed to read the input signal values, including the engine speed $N_e$, the throttle setting THR, the brake position BR, and the output speed $N_o$. Then the START flag is checked as indicated at the decision block 164 to determine if the clutch 60 is in the process of being engaged. A logic one START flag value (flag set) indicates that the clutch 60 is not yet fully engaged; a logic zero value (flag reset) indicates that the clutch 60 is fully engaged. Since the START flag is initially set to a logic one by the instruction block 160, decision block 164 is initially answered in the affirmative. In such case, the instruction and decision blocks in the flow chart branch 166 are executed. If decision block 164 has been answered in the negative, the instruction and decision blocks in the flow chart branch 168 would have been executed. In either case, an energization duty cycle is outputted to driver 156 on line 146 as indicated by the instruction block 170, and the microcomputer 132 is directed by the flow line 172 to reexecute the program beginning with the instruction block 162.

The flow chart branch 166 represents program instructions for determining the proper energization duty cycle for solenoid coil 118 (blocks 174 and 176) and for resetting the START flag to a logic zero if appropriate to update the clutch engagement status (blocks 178 and 180). The instruction block 174 depicts the program instructions for developing the engine reference speed value $N_{ref}$. First, the desired steady state engine speed value $N_{ss}$ is generated as a function of the engine throttle setting THR. Such value may be generated from a look-up table containing the information graphically depicted by the trace 26 of FIG. 3, as described above. Then a time response characteristic generally resembling that of the vehicle engine is applied to the steady engine speed value $N_{ss}$ to obtain the engine reference speed value $N_{ref}$. As indicated above, the time response characteristic may either be of first order or higher order. As indicated at block 174, the illustrated embodiment generates the speed reference $N_{ref}$ with a first order time response characteristic according to the expression:

$$N_{ref} = K_1 * N_{ss} + K_2 * N_{ref}$$

where $K_1$ and $K_2$ are constants which determine the time constant and steady state gain of the transfer function.

The instruction block 176 depicts the program instructions for developing the corrected or compensated duty cycle $DC_c$. First, the error $E_r$ between the actual engine speed $N_e$ and the reference engine speed $N_{ref}$ is determined. The error $E_r$ is then integrated with respect to time to form a vernier, or corrective, duty cycle term $E_c$ according to the expression:

$$E_c = E_c + (K_3 * E_r)$$

where $K_3$ is an integration time constant. The principal duty cycle term DC is then determined as a function ($f_1$) of the engine speed $N_e$. Such term may be obtained from a look-up table within microcomputer 132 containing the information depicted by the trace 18 in FIGS. 1 and 2 as described above. The final or compensated duty cycle $DC_c$ for the coil 118 is then determined according to the difference between the principal duty cycle DC and the corrective duty cycle term $E_c$. This operation corresponds to the summing junction 42 depicted in FIG. 6.

The decision block 78 then determines if the slip or speed difference between the input and output shafts 62 and 64 is less than or equal to a relatively small slip value $S_{min}$. If so, the clutch is considered to be fully engaged for control purposes, and instruction block 180 is executed to reset the START flag. If not, the execution of instruction block 180 is skipped, as indicated by the flow line 182.

The flow chart branch 168 represents program instructions for developing a suitable duty cycle value $DC_c$ for maintaining the clutch 60 fully engaged (block 184) and for determining if disengagement of the clutch 60 is appropriate (blocks 186, 188, 190 and 192). As indicated at instruction block 184, the duty cycle term $DC_c$ to maintain full clutch engagement is determined as a function ($f_2$) of the engine speed $N_e$. Such function operates to produce a significantly higher duty cycle value than the function $f_1$ defined in instruction block 174. Graphically, the function $f_2$ would be similar in overall shape to the trace 18 depicted in FIGS. 1, 2 and 6, but significantly higher, as indicated by the broken tracer 194 in FIG. 6. If the throttle or accelerator pedal is released and the vehicle brake is on, disengagement of the clutch 60 is appropriate. Decision block 186 compares the throttle setting THR to a value $T_{min}$ representative of the minimum throttle setting. If THR is greater than $T_{min}$, execution of the blocks 188, 190 and 192 is skipped as indicated by the flow line 196. If THR is less than or equal to $T_{min}$, the throttle or accelerator pedal has been released, and decision block 188 is executed to determine if the vehicle brake is depressed. If not, the clutch 60 is to remain engaged, and the execution of blocks 190 and 192 is skipped as indicated by the flow line 198. If so, the clutch 60 should be disengaged, and the instruction blocks 190 and 192 are executed to set the START flag to reset the reference speed $N_{ref}$ and the corrective term $E_c$ to zero. In the following program cycle, the decision block 164 will be answered in the affirmative, directing the microcomputer 130 to execute the program instructions of branch 166. Since the reference speed $N_{ref}$ has been reset to zero by instruction block 192, and the engine speed $N_e$ is still relatively high, the error term $E_r$ is negative in sign, and the duty cycle term $DC_c$ developed by instruction block 176 initiates disengagement of the clutch 60.

The graphs of FIGS. 9A–9G have a common time base and illustrate the operation of this invention for a system having no open loop torque capacity error, such as the system depicted by the trace 28 in FIG. 5, and for a system where actuator and/or clutch performance variations induce an open loop torque capacity error of 10%, such as the system depicted by the trace 36 in FIG. 5. The graphs depicted in FIGS. 9D and 9E refer to the system having no error, and the graphs depicted in FIGS. 9F and 9G refer to the system having 10% error. Each system responds to a step change in the throttle setting THR, as seen in FIG. 9A, which in turn produces steady state and reference speed values $N_{ss}$ and $N_{ref}$ as shown in FIGS. 9B and 9C, respectively. For the purpose of description, it will be assumed (as in FIG. 5) that the desired steady state speed $N_{ss}$ corresponding to the step change in throttle setting is 2000 RPM.

In the system illustrated by the graphs of FIGS. 9D and 9E where there is no open loop torque capacity error, the engine speed $N_e$ (FIG. 9D) increases substantially according to the speed reference $N_{ref}$ since the time response characteristic used to develop the speed reference $N_{ref}$ generally corresponds to that of the engine. As a result, the engine speed increases to the desired steady state speed $N_{ss}$ of 2000 RPM, and the corrective term $E_c$ (FIG. 9E) returns to zero after an initial fluctuation. The magnitude of such fluctuation, of course, depends on how well the time response characteristic of block 48 (FIG. 6) corresponds to the actual time response characteristic of the engine.

In the system illustrated by the graphs of FIGS. 9F and 9G where there is an open loop torque capacity error of 10%, the engine speed $N_e$ has a tendency to increase too rapidly, resulting in a net speed error $E_r$ that is negative in sign. When the error term $E_c$ is integrated by block 52 (FIG. 6), a negative sign corrective term $E_c$ results, as seen in FIG. 9G. Such corrective term $E_c$ compensates for the open loop torque capacity error by increasing the duty cycle of energization applied to the actuator during engagement of the clutch. As noted in reference to FIG. 9E, the increase of the corrective term $E_c$ at the initiation of the throttle step change is due to the slight mismatch between the time response characteristic of block 48 (FIG. 6) and the actual time response characteristic of the engine.

Figure 9:
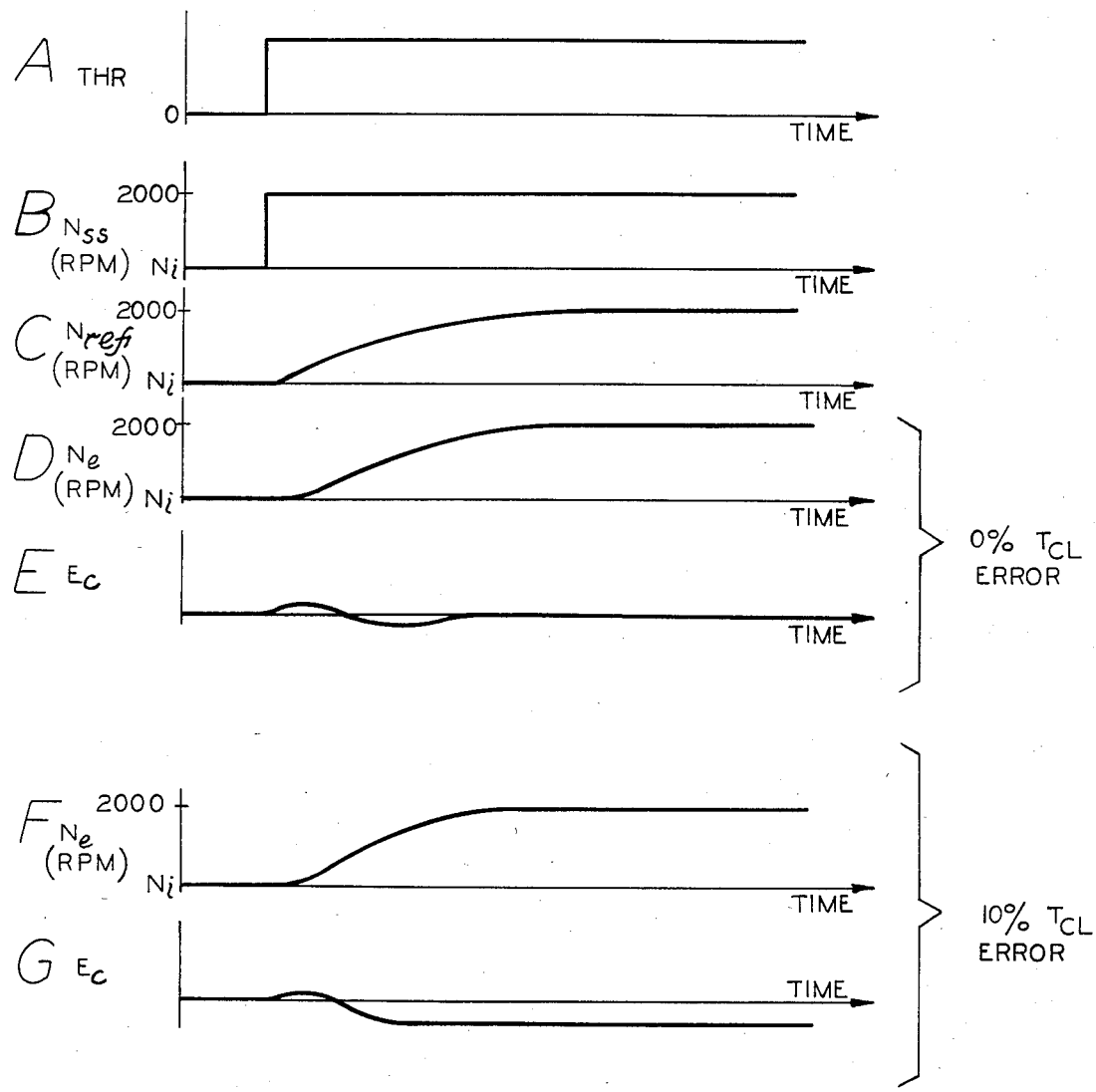
FIGS. 9A–9G are time based graphs depicting the operation of the control system depicted in FIG. 6.

In view of the above, it is seen that the control system of this invention operates to eliminate steady state engine speed error during engagement of the clutch 60 while maintaining engine speed stability when it is increasing up to the desired steady state value $N_{ss}$. The principal duty cycle value DC obtained from the block 16 is combined with the corrective, or vernier, duty cycle value $E_c$ obtained from the blocks 46, 48, 50 and 52 to form a compensated duty cycle value $DC_c$, which when applied to actuator 110 controls the torque capacity of the clutch 60 in a manner to smoothly accelerate the engine speed from its idle value $N_i$ to the throttle-dependent steady state value $N_{ss}$. As seen in FIG. 9, the corrective, or vernier, duty cycle value $E_c$ has substantially no effect on the principal duty cycle value DC when the actuator 110 and clutch 60 operate at their nominal performance level. However, when the performance level(s) of the actuator 110 and/or clutch 60 experience variation due to temperature, voltage, wear, miscalibration, etc., the corrective, or vernier duty cycle term $E_c$ assumes a value which compensates the applied duty cycle $DC_c$ for the variation. As a result, the desired clutch engagement feel as defined by the trace 18 in FIG. 6 may be repeatably produced in spite of the above-identified performance variations.

While this invention has been described in reference to the illustrated embodiment, it will be understood that this invention is not limited thereto. Various modifications to the illustrated embodiment will occur to those skilled in the art and systems incorporating such modifications may fall within the scope of this invention which is defined by the appended claims.

The embodiments of the invention in which an exclusive property or privilege is claimed are defined as follows:

1. For a motor vehicle including a fluid-operated clutch for transmitting torque from the engine to the transmission wherein the speed of the engine during engagement of the clutch for a given setting of the engine throttle is determined by the torque capacity of the clutch which in turn is determined by the energization duty cycle of an electrically operated actuator, the combination comprising:

principal clutch control means responsive to the speed of the engine for defining a principal energization duty cycle value as a function of engine speed; and vernier clutch control means responsive to the difference between the actual engine speed and a reference engine speed for developing a vernier energization duty cycle value which is combined with the principal energization duty cycle value and applied to said actuator thereby to compensate the applied duty cycle value for variations in the actual engine speed due to performance variations in the actuator and other components of the system, the vernier clutch control means including means for integrating the difference between the actual engine speed and the reference engine speed to form the vernier duty cycle value thereby to minimize the steady state value of such difference, means responsive to the engine throttle setting to define a steady state reference engine speed value at which it is desired to maintain the actual engine speed relatively constant during engagement of said clutch, and means responsive to changes in the steady state reference engine speed value during engagement of the clutch to effect the required changes in value as a function of time in accordance with a dynamic response characteristic that generally approximates the dynamic response characteristic of the engine thereby to stabilize the engine speed response during engagement of the clutch.

2. For a motor vehicle including a fluid-operated clutch for transmitting engine output torque to the vehicle drivetrain and an electrically operated interface element energizable at a variable duty cycle for regulating the torque capacity of the clutch, a control system for operating the interface element comprising:

principal control means including duty cycle look-up means responsive to the engine speed for supplying a principal duty cycle value for said interface element such that the torque capacity of the clutch is progressively increased with increasing engine speed to a value substantially equal to the engine output torque whereafter the engine speed is maintained substantially constant at a steady state value for the remainder of the clutch engagement;

vernier control means including engine speed look-up means responsive to the engine throttle setting for supplying a reference steady state speed value at which it is desired to maintain the engine speed substantially constant during clutch engagement, means responsive to changes in the reference steady state speed value during clutch engagement to form a dynamic engine speed reference signal by applying a time response characteristic to such changes which generally approximates the time response characteristic of the engine, and means for integrating the difference between the dynamic engine speed reference signal and the actual engine speed with respect to time to form a vernier duty cycle value; and means for combining the principal duty cycle value with the vernier duty cycle value and energizing the interface element in accordance therewith so as to adaptively compensate the energization duty cycle for performance variations in the interface element and clutch whereby the engine speed during clutch engagement is repeatably controlled regardless of such performance variations.

3. For a motor vehicle including a fluid-operated clutch for transmitting engine output torque to the vehicle drivetrain wherein the speed of the engine during engagement of the clutch for a given setting of the engine throttle is determined by the torque capacity of the clutch which in turn is determined by the energization duty cycle of an electrically operated actuator, the combination comprising:

means effective during engagement of said clutch for energizing the actuator according to the combination of a principal duty cycle value and a vernier duty cycle value, the principal duty cycle value being determined as a function of engine speed such that the engine speed is progressively increased to a steady state value and thereafter maintained at such value for the remainder of the clutch engagement and the vernier duty cycle value being determined as a function of the integral with respect to time of the difference between the actual engine speed and a reference engine speed having imposed thereon a dynamic time response characteristic that generally approximates the dynamic time response characteristic of the engine; and means effective following engagement of said clutch for energizing the actuator in accordance with a further duty cycle value determined as a function of engine speed such that the torque capacity of the clutch is maintained in excess of the engine output torque thereby to maintain the clutch engagement.

* * * * *